United States Patent
Sato et al.

(10) Patent No.: US 12,059,665 B2
(45) Date of Patent: Aug. 13, 2024

(54) ACTIVE CARBON MOLDED BODY

(71) Applicant: LIXIL Corporation, Tokyo (JP)

(72) Inventors: Kazuhiro Sato, Tokyo (JP); Masanari Toyama, Tokyo (JP); Hirohito Nakajima, Tokyo (JP); Takeyuki Yamamoto, Tokyo (JP); Takahisa Ishikawa, Tokyo (JP); Hiroki Maenami, Tokyo (JP); Hajime Ota, Tokyo (JP); Takao Otsuka, Tokyo (JP); Daiki Honda, Tokyo (JP); Hiroto Tasaki, Tokyo (JP)

(73) Assignee: LIXIL CORPORATION, Tokyo (JP)

( * ) Notice: Subject to any disclaimer, the term of this patent is extended or adjusted under 35 U.S.C. 154(b) by 810 days.

(21) Appl. No.: 16/972,677

(22) PCT Filed: Apr. 1, 2019

(86) PCT No.: PCT/JP2019/014499
§ 371 (c)(1),
(2) Date: Dec. 7, 2020

(87) PCT Pub. No.: WO2019/235045
PCT Pub. Date: Dec. 12, 2019

(65) Prior Publication Data
US 2021/0245134 A1    Aug. 12, 2021

(30) Foreign Application Priority Data

Jun. 8, 2018 (JP) ................. 2018-110662

(51) Int. Cl.
*B01J 20/20* (2006.01)
*B01J 20/26* (2006.01)
*B01J 20/28* (2006.01)
*B01J 20/30* (2006.01)
*C02F 1/28* (2023.01)

(52) U.S. Cl.
CPC .............. *B01J 20/20* (2013.01); *B01J 20/261* (2013.01); *B01J 20/28011* (2013.01); *B01J 20/28028* (2013.01); *B01J 20/3007* (2013.01); *B01J 20/3028* (2013.01); *B01J 20/3042* (2013.01); *C02F 1/283* (2013.01)

(58) Field of Classification Search
CPC ...... B01J 20/20; B01J 20/28; B01J 20/28004; B01J 20/28011; B01J 20/2803; B01J 20/28085; C01B 32/354; C01B 32/384; C02F 1/283; C02F 2201/006; C01P 2004/03
See application file for complete search history.

(56) References Cited

FOREIGN PATENT DOCUMENTS

| JP | 2008086865 | * | 4/2008 | .............. B01J 20/28 |
| JP | 2017-127860 A | | 7/2017 | |
| JP | 2017-178697 A | | 10/2017 | |
| WO | 2017/170754 A1 | | 10/2017 | |

OTHER PUBLICATIONS

Machine translation of Toyoshima et al (Year: 2008).*
Machine translation of WO2017/170754 (Year: 2017).*

* cited by examiner

*Primary Examiner* — Brian A McCaig
(74) *Attorney, Agent, or Firm* — RANKIN, HILL & CLARK LLP (57) ABSTRACT

An active carbon molded body that comprises a plurality of active carbon granules that are formed from aggregates of active carbon particles. The active carbon granules include a fibrous granulation binder. The active carbon molded body is formed as a result of the plurality of active carbon granules being aggregated by means of the fibrous granulation binder in the active carbon granules.

The present invention is also an active carbon molded body production method in which active carbon granules that have been formed by aggregating active carbon particles by means of a fibrous binder are molded by simultaneous application of heat and pressure without separate addition of a molding binder.

The present invention thereby provides: an active carbon molded body that has high purification capacity and good production efficiency; and a production method for the active carbon molded body.

5 Claims, 6 Drawing Sheets

ACTIVE CARBON MOLDED BODY

This application is based on and claims the benefit of priority from Japanese Patent Application No. 2018-110662, filed on 8 Jun. 2018, the content of which is incorporated herein by reference.

TECHNICAL FIELD

The present invention relates to an active carbon molded body. More specifically, the present invention relates to an active carbon molded body for water purification.

BACKGROUND ART

Conventionally, tap water purified with a water purifier is used as drinking water and water for cooking.

In general, a water purifier incorporates a filter and the like, together with active carbon or a molded body of active carbon particles as a filter medium.

For example, a water purifier has been proposed which incorporates a molded body of active carbon particles such as powder of coconut shell active carbon.

A reduction in the particle diameter of the active carbon particles leads to an increase in a contact area between the active carbon particles and water flowing through the water purifier, so that the purification performance is improved. From the viewpoint of filtration flow rate, active carbon particles having a particle diameter of about 80 μm are used in many cases. On the other hand, in regions where tap water is supplied at a high pressure, active carbon molded bodies including carbon particles having a smaller particle diameter and achieving higher purification performance are preferably used.

To facilitate handling of active carbon, use of active carbon granules has been under consideration.

Even when such active carbon granules are used, it is required to increase the water purification capability while maintaining a filtration flow rate which does not cause inconvenience to the user.

Patent Document 1: Japanese Unexamined Patent Application, Publication No. 2017-178697
Patent Document 2: Japanese Unexamined Patent Application, Publication No. 2017-127860

DISCLOSURE OF THE INVENTION

Problems to be Solved by the Invention

In a method of producing an active carbon molded body, a hot-melt resin binder for molding purpose is mixed to mold active carbon. However, it is difficult to uniformly mix active carbon and such a molding-purpose binder in terms of production control, and defective products are likely to be produced due to segregation of the binder.

In view of the foregoing, the present invention is intended to provide a highly-reactive active carbon molded body and to increase production efficiency of the active carbon molded body.

Means for Solving the Problems

A first aspect of the present invention is directed to an active carbon molded body comprising a plurality of active carbon granules each comprising an aggregation of active carbon particles. The active carbon granule includes a granulation-purpose fibrous binder. The active carbon molded body is obtained by molding the plurality of active carbon granules aggregated by the granulation-purpose fibrous binder included therein.

A second aspect of the present invention is an embodiment of the first aspect. The active carbon molded body of the second aspect preferably includes no molding-purpose binder other than the granulation-purpose fibrous binder.

A third aspect of the present invention is an embodiment of the first or second aspect, wherein the fibrous binder is preferably included in an amount of 6 wt % or more.

A fourth aspect of the present invention is an embodiment of the first to third aspects. The active carbon molded body of the fourth aspect preferably has a density of 0.4 g/cc to 0.5 g/cc.

A fifth aspect of the present invention provides a method for producing an active carbon molded body. The method includes: obtaining a plurality of active carbon granules by aggregating active carbon particles by a granulation-purpose fibrous binder; aggregating the active carbon granules by the granulation-purpose fibrous binder included in the active carbon granules; and molding the aggregated active carbon granules.

Effects of the Invention

The present invention can provide a highly-reactive active carbon molded body and can increase production efficiency of the active carbon molded body by omitting a step of mixing a molding-purpose binder.

PREFERRED MODE FOR CARRYING OUT THE INVENTION

An embodiment of the present invention will be described below. Note that the present invention is not limited to the following embodiment.

Active carbon granules according to the present embodiment are usable in, for example, a water purification cartridge incorporated in a water purification apparatus for purifying water to be treated, such as tap water.

The active carbon granules of this type remove removal targets contained in water to be treated, by oxidative decomposition or adsorption.

Examples of the removal targets include odor substances in tap water, such as free residual chlorine, and organic compounds in tap water, such as trihalomethane.

<Active Carbon Granule>

The active carbon granule according to the present embodiment includes active carbon particles and a granulation-purpose fibrous binder. The active carbon particles are aggregated by the granulation-purpose fibrous binder so as to form the active carbon granule.

As the active carbon particles, active carbon produced from any starting material can be used.

Specifically, usable active carbon can be produced by way of activating carbon obtained from carbonizing coconut shell, coal, phenolic resin, or the like at a high temperature. Activation is a reaction which changes a carbonaceous raw material into a porous material by developing micropores of the carbonaceous raw material, and is caused by, for example, a gas such as carbon dioxide or water vapor, or a chemical. The majority of such active carbon particles comprise of carbon, whereas there are some active carbon particles comprising a compound of carbon and oxygen or a compound of carbon and hydrogen.

The active carbon particles according to the present embodiment preferably have a median particle diameter $D_1$ of 40 μm or less.

When the median particle diameter of the active carbon particles is within this range, the active carbon granules including the active carbon particles increase in adsorption amount of the removal targets per unit mass.

This is because the specific surface area of the active carbon granule including the active carbon particles increases with a decrease in the median particle diameter of the active carbon particles.

Note that the median particle diameter $D_1$ of the active carbon particles may be greater than 40 μm, but in this case, the necessity to granulate the active carbon is low because the active carbon particles are less prone to densification and the resistance to water flow is less likely to increase. Further, as will be described later, from the viewpoint of an adsorption rate of the removal targets, it is preferable that the median particle diameter of the active carbon particles is small.

In the present embodiment, the median particle diameter $D_1$ of the active carbon particles is a value measured by a laser diffraction method, and refers to the value of a 50% diameter ($D_{50}$) in volume-based cumulative fraction.

For example, $D_1$ is measured by Microtrac MT3300EXII (a laser diffraction/scattering-type particle diameter distribution measurement device, manufactured by Microtrac-BEL Corp.).

The active carbon granules including the above-described active carbon particles according to the present embodiment have a high adsorption rate with respect to the removal targets.

Water purification cartridges included in water purifiers are required to have extremely high adsorption rates.

For example, a common water purification cartridge has a capacity of about 35 cc. If tap water as water to be treated flowing at a flow rate of, for example, 2500 cc/min is made to permeate the common water purification cartridge, it is calculated that all the water in the cartridge is replaced in about 0.8 seconds.

Therefore, when the active carbon has an insufficient adsorption rate, the removal targets cannot be removed to a sufficient extent, depending on the flow rate of the water to be treated.

The relationship between the adsorption rate and the particle diameter of active carbon will be described with reference to the accompanying drawings.

Figure 1:
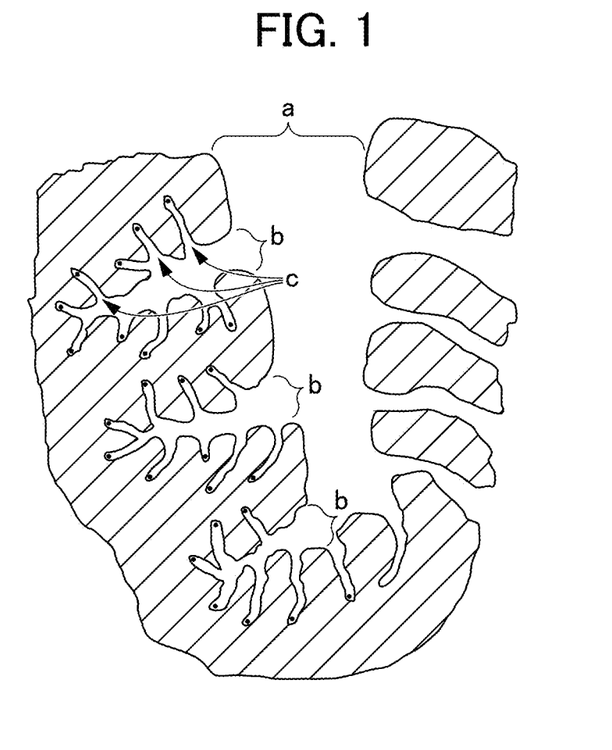
FIG. 1 is a schematic diagram showing, on an enlarged scale, a cross section of the vicinity of a surface of a conventional active carbon particle.

FIG. 1 is a schematic diagram showing, on an enlarged scale, a cross section of the vicinity of a surface of an active carbon particle (having a particle diameter of 80 μm) used in a conventional water purifier.

Figure 2:
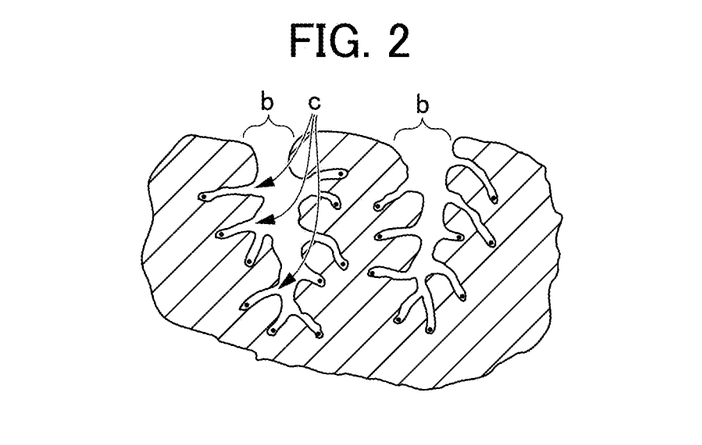
FIG. 2 is a schematic diagram showing, on an enlarged scale, a cross section of the vicinity of a surface of an active carbon particle according to the present embodiment.

FIG. 2 is a schematic diagram also showing, on an enlarged scale, a cross section of the vicinity of a surface of an active carbon particle of the present embodiment having a relatively small diameter (e.g., a particle diameter of about 10 μm).

In FIGS. 1 and 2, the reference character a denotes a macropore having a diameter of 50 nm or greater, the reference character b denotes a mesopore having a diameter of 2 nm to 50 nm, and the reference character c denotes a micropore having a diameter of 2 nm or less.

Portions with a black dot are reaction sites where the removal targets are adsorbed.

Each pore in the surface of active carbon adsorbs a substance that matches with the size of the pore. As shown in FIGS. 1 and 2, the majority of the reaction sites are present in the micropores c.

This is because water treatment principally removes, as the removal targets, substances having a relatively small molecular weight, such as free chlorine and $CHCl_3$ as trihalomethane.

In FIG. 1, the removal targets, such as $CHCl_3$, which have entered through the surface of active carbon, pass through the macropores a, the mesopores b, and the micropores c, and then, arrive at the reaction sites.

In contrast, in FIG. 2, the removal targets, such as $CHCl_3$, which have entered through the surface, pass through the mesopores b and the micropores c, and then, arrive at the reaction sites. Thus, the distance to the reaction sites in FIG. 2 is shorter than in FIG. 1.

Consequently, the active carbon particles according to the present embodiment have a higher adsorption rate than the conventional active carbon particles.

The fibrous binder included in the active carbon granule according to the present embodiment is fine fibers which are called, for example, microfibers or nanofibers, and are entangled with the active carbon particles so as to contribute to formation of the granulated body.

Examples of such microfibers and nanofibers include acrylic microfibers and acrylic nanofibers.

Fibers with a structure in which an acrylic material forms a fibrous aggregation and having a fiber diameter of micro size are called acrylic microfibers. Such fibers having a fiber diameter smaller than micro size are called acrylic nanofibers.

The active carbon granule according to the present embodiment is composed of the above-described active carbon particles, the acrylic nanofibers or the like as the above-described fibers, which bind to each other.

Although a mechanism is uncertain by which the active carbon particles, the acrylic nanofibers or the like as the fibrous binder bind to each other to form a granulated body, the following reason is conceivable, for example.

First, the fibrous binder and the active carbon particles become entangled with one another, whereby mechanical strength is provided.

The active carbon granules according to the present embodiment are produced as granulated bodies having the fibrous binder and the active carbon particles entangled with one another, by a method of producing the active carbon granules to be described later.

Further, the surface of active carbon particles is not completely hydrophobic, and several percent of oxygen is present on the surface of active carbon in the form of a carboxy group or a hydroxy group.

Similarly, on the surface of acrylic nanofibers or the like, acrylic-derived oxygen atoms and acrylic-derived hydrogen atoms are present.

Therefore, hydrogen bonds or the like are presumed to exist between the surface of active carbon and the acrylic nanofibers and to contribute to formation of the firm granulated body.

Note that the "bond" and "bind" as used in the description of the present invention refer to a concept including the mechanical bond due to entanglement of the above-described fibrous binder and the active carbon particles and the chemical bond such as the hydrogen bond.

<Water Purification Cartridge>

The water purification cartridge according to the present embodiment is for use in a water purifier for purifying water to be treated, such as tap water, and includes the active carbon granules described above.

The water purification cartridge according to the present embodiment is not particularly limited.

The active carbon granules to be included in the water purification cartridge are, for example, dispersed in water and converted into a slurry, and then, subjected to suction molding so as to be used as the active carbon molded body.

The active carbon molded body may further include fibril fibers or an ion-exchange material.

The water purification cartridge according to the present embodiment may further include a ceramic filter or the like as a support for supporting the active carbon molded body, a filter such as a hollow fiber membrane, or a nonwoven fabric or the like for protecting the surface of the active carbon molded body.

<Method of Producing Active Carbon Granules>

A method of producing the active carbon granules according to the present embodiment includes a stirring step, a granulation step, and a dehydration step.

First, in the stirring step, active carbon particles pulverized and classified by a known method and having an arbitrary particle diameter, a fibrous binder such as nanofibers, and water are mixed together and stirred, thereby obtaining a slurry-like raw material mixture.

Next, in the granulation step, the raw material mixture is granulated.

Although any granulation process may be used, the granulation can be performed using a spray dryer method, for example. According to the spray dryer method, the raw material mixture is loaded into a spray dryer and spray dried, whereby granules of the raw material mixture are obtained.

The granules can be made to have a desired size by appropriately adjusting parameters, such as an ejection pressure of the spray dryer, a nozzle diameter, a circulating air volume, and a temperature.

Using the spray dryer method makes it possible to produce the granulated bodies (in a dry state) including the active carbon particles and the fibrous binder that are entangled with one another.

Thereafter, in the dehydration step, the formed granules of the raw material mixture are placed in a heating furnace and dehydrated.

The heating temperature is not particularly limited, and may be set to, for example, about 130° C.

The dehydration in the dehydration step firms up the granulated bodies of the active carbon particles and the fibrous binder, such that the structure of the granulated bodies does not collapse even when the granulated bodies are placed into water.

Further, the granulated bodies have therein communicating pores formed among the active carbon particles and allowing flowing water to pass therethrough.

Through the steps described above, the active carbon granules according to the present embodiment can be produced.

The active carbon granules according to the present embodiment preferably have a median particle diameter $D_2$ greater than 40 μm although the median particle diameter $D_2$ is not particularly limited.

The active carbon granules having a median particle diameter $D_2$ greater than 40 μm are less prone to densification, thereby making it less likely for the resistance to water flow to increase.

The median particle diameter $D_2$ is preferably 2 mm or less. Adjusting the median particle diameter $D_2$ to 2 mm or less can cause the active carbon granules to have smaller voids among them and can increase the entire active carbon in the adsorption amount per volume.

From this viewpoint, it is more preferable to adjust the median particle diameter $D_2$ to 150 μm or less.

Like the median particle diameter $D_1$, the median particle diameter $D_2$ is a value measured by the laser diffraction method, and refers to the value of a 50% diameter ($D_{50}$) in volume-based cumulative fraction.

The above-described active carbon granules according to the present embodiment are superior in purification performance to the conventional active carbon particles.

Figure 3:
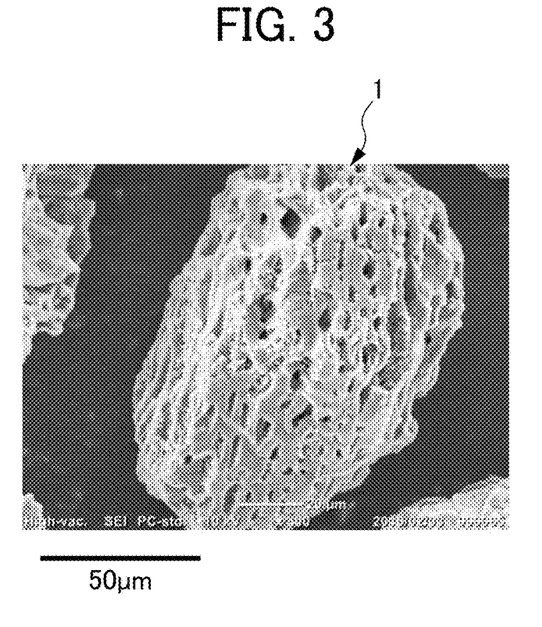
FIG. 3 is a scanning electron microscope (SEM) photograph of a conventional active carbon particle.
Figure 4:
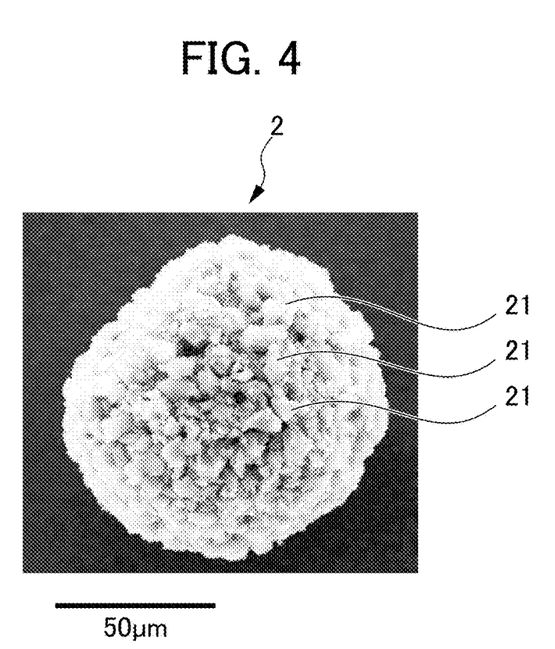
FIG. 4 is an SEM photograph of an active carbon particle according to the present embodiment.

FIG. 3 is a photograph of a conventional active carbon particle. FIG. 4 is a photograph of the active carbon granule according to the present embodiment. Both photographs were taken by a scanning electron microscope after the particles and the granules had been sifted through a sieve of 63 μm/90 μm (170 mesh/230 mesh) so as to have a similar particle size distribution.

FIG. 3 shows the conventional active carbon particle 1, whereas FIG. 4 shows the active carbon granule 2 according to the present embodiment that includes the active carbon particles 21.

Figure 5:
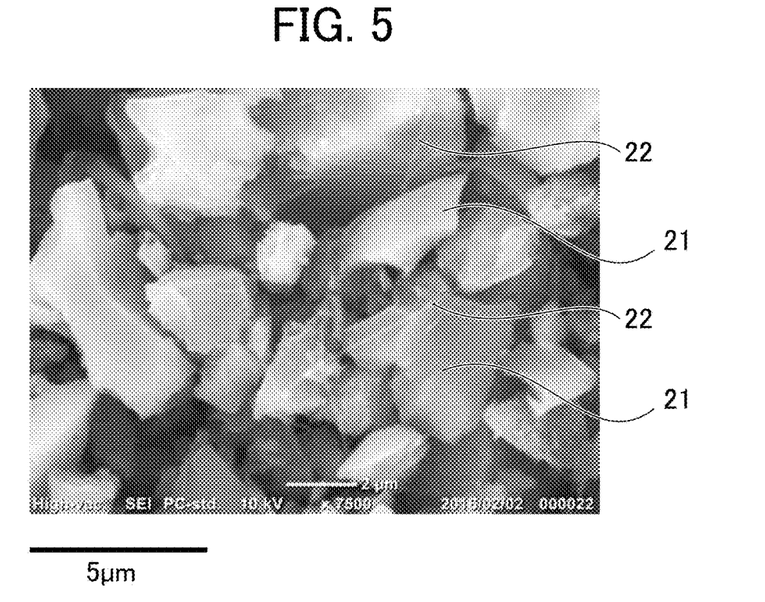
FIG. 5 is an SEM photograph of an active carbon particle according to the present embodiment.

FIG. 5 is a photograph of the active carbon granule 2 according to the present embodiment, taken on a further enlarged scale by a scanning electron microscope.

As is apparent from FIG. 5, the active carbon particles 21 and the fibers 22, which are entangled with one another, form the granulated body, without a binder resin.

As is apparent from FIGS. 3 and 4, the active carbon granule 2 according to the present embodiment is formed by granulating the active carbon particles 21 that have a smaller particle diameter than the conventional active carbon particle 1, and is superior in specific surface area.

In the present embodiment, any method of determining the presence or absence of the granulated body may be used. For example, the presence or absence of granulated body can be determined by observation using an electron microscope or the like.

<Method of Producing Active Carbone Molded Body>

Figure 6:
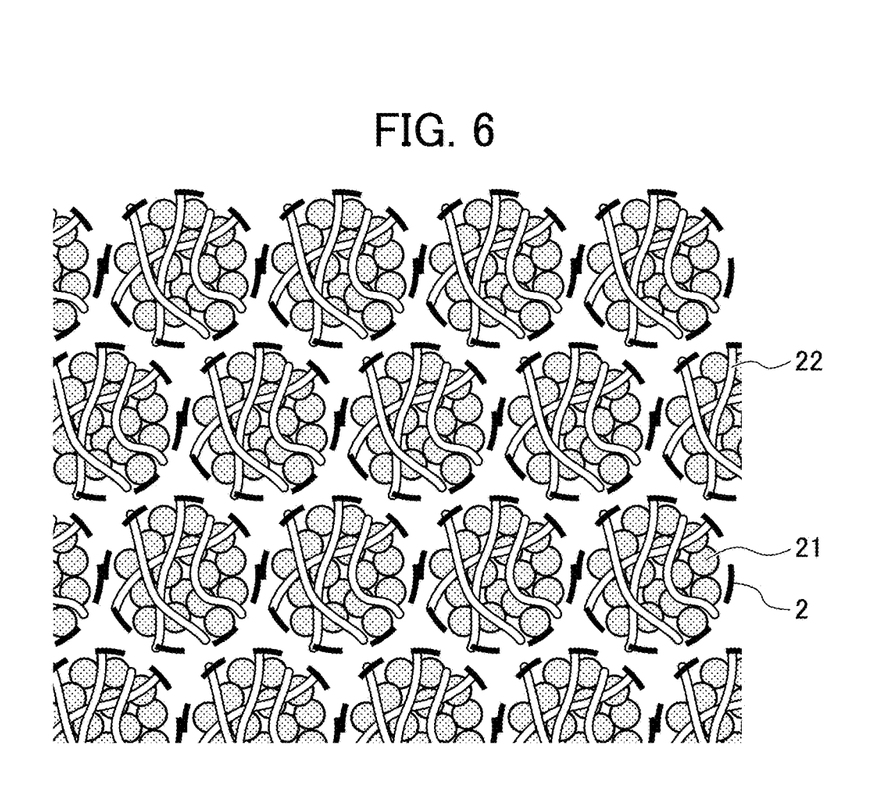
FIG. 6 is a schematic diagram showing a molded state of an active carbon molded body according to the present embodiment.

FIG. 6 is a schematic diagram showing a molded state of the active carbon molded body according to the present embodiment.

The above-described active carbon granules are subjected to application of a pressure of 2 kg/cm for 30 minutes under temperature conditions of 140° C., whereby a molded body having a desired shape can be obtained.

At this time, the granulation-purpose binder in the active carbon granules is melted, which makes it possible to mold the active carbon granules without addition of a molding-purpose binder.

However, a small amount of a molding-purpose binder may be optionally added to increase the strength of the molded body.

This production method, which does not require a molding-purpose binder having a large particle diameter, can produce a highly-reactive molded body of active carbon fine particles.

Further, a step of mixing such a molding-purpose binder can be omitted from the molding process, eliminating the risk of binder segregation. As a result, homogeneous active carbon molded bodies can be produced while reducing defective products, thereby increasing the production efficiency.

The above-described active carbon molded body of the granules including the active carbon fine particles has a density ranging preferably from 0.40 g/cc to 0.50 g/cc, and more preferably from 0.46 g/cc to 0.50 g/cc.

The active carbon granules included in the active carbon molded body have smaller densities than the conventional active carbon particles because of voids present in the active carbon granules. On the other hand, since no molding-purpose binder having a large particle diameter is used in the molding process, the active carbon granules are dense and in contact with one another.

Therefore, although the active carbon molded body according to the present embodiment does not necessarily differ in density from the conventional products, high purification performance can be achieved at least within the density range described above.

The above-described active carbon molded body according to the present embodiment exerts the following effects.

(1) The active carbon molded body includes the active carbon particles and the fibrous binder uniformly dispersed among the active carbon particles, the active carbon particles and the fibrous binder binding to each other.

Thus, the highly-reactive molded body of the active carbon fine particles can be produced, thereby contributing to improvement of purification performance.

(2) In the active carbon molded body according to (1), the active carbon particles are aggregated by the fibrous binder to form the active carbon granules.

This feature makes it possible to increase the specific surface area, and to achieve high purification performance.

(3) In the active carbon molded body according to (1) or (2), the fibrous binder is included in an amount of 6 wt % or more.

With this feature, the fibrous binder is sufficiently distributed in the active carbon molded body, enabling production of the homogenous and strong active carbon molded body.

(4) The active carbon molded body according to any one of (1) to (3) has a density of 0.4 g/cc to 0.5 g/cc.

This feature makes it possible to increase the specific surface area, and to achieve high purification performance.

(5) The granules constituted by the active carbon particles aggregated by the fibrous binder are subjected to simultaneous application of heat and pressure without separate addition of a molding-purpose binder, whereby the active carbon molded body is produced.

This feature eliminates the need for a molding-purpose binder having a large particle diameter, and enables production of the highly-reactive molded body of the active carbon fine particles.

Further, a step of mixing such a molding-purpose binder is omitted from the molding process, eliminating the risk of binder segregation. As a result, homogeneous active carbon molded bodies can be produced while reducing defective products, thereby increasing the production efficiency.

Note that the present invention is not limited to the embodiment described above, but encompasses modifications and improvements within the range in which the object of the present invention can be achieved.

Although acrylic nanofibers and the like have been described as examples of the fibrous binder of the present invention, the fibrous binder is not limited to the acrylic nanofibers and the like, and may be any binder as long as granulated bodies can be formed using it.

EXAMPLES

The present invention will be described further in detail with reference to examples. Note that the present invention is not limited to the following examples.

Examples 1 to 4, Comparative Example 2

First, active carbon was pulverized and classified so that active carbon particles were produced.

Acrylic nanofibers and water were added to the active carbon particles. The particles and the nanofibers were dispersed by way of stirring, whereby a slurry-like mixture was obtained. The slurry-like mixture was processed using a spray drier, and thereafter, dehydrated by being heated at about 130° C. in a heating furnace. As a result, active carbon granules were obtained.

The obtained active carbon granules and conventional active carbon particles were subjected to granule/particle diameter measurement according to a laser diffraction method. The surfaces of the active carbon granules and particles were observed using an electron microscope.

Table 1 shows the result of the granule/particle diameter measurement. FIG. 7 shows the results of the surface observation.

The obtained active carbon granules were molded into a shape having an outer diameter of 24.5 mm, an inner diameter of 8.1 mm, and a height of 90 mm, by hot press molding which was performed by applying a pressure of 2 kg/cm for 30 minutes under temperature conditions of 140° C.

Comparative Example 1

As Comparative Example 1, active carbon particles were mixed with a molding-purpose binder, and the resultant mixture was molded by the same hot press molding, without being granulated.

Each active carbon molded body obtained in the above-described manner was subjected to a filtering capability test with respect to free residual chlorine, based on JIS S3201.

The results are shown in Table 1.

TABLE 1

|  | Comparative Example 1 | Comparative Example 2 | Example 1 | Example 2 | Example 3 | Example 4 |
|---|---|---|---|---|---|---|
| Active Carbon Granule Diameter D50 (μm) | — | 96 | 113 | 94 | 78 | 66 |
| Amount of Granulation-Purpose Fibrous Binder (wt %) | — | 2 | 6 | 10 | 15 | 20 |
| Active Carbon Particle Diameter D50 (μm) | 65 | 8 | 8 | 8 | 8 | 8 |
| Amount of Molding-Purpose Binder (wt %) | 10 | — | — | — | — | — |
| Density of Molded Body (g/cc) | 0.49 | 0.51 | 0.50 | 0.47 | 0.46 | 0.49 |
| Free Residual Chlorine Filtering Capability (L) | 1150 | — | 3200 | 2600 | 2050 | 1650 |

FIGS. 7A to 7F are each a micrograph (×240) of the active carbon particles or the active carbon granules according to Comparative Examples 1 and 2, and Examples 1 to 4.

Figure 7A:
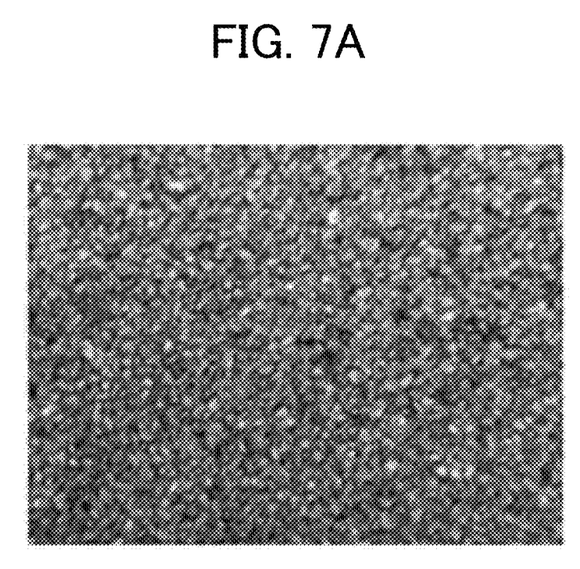
FIG. 7A is a micrograph of an active carbon particle of Comparative Example 1 according to the present embodiment.

Comparative Example 1 shown in FIG. 7A exhibits relatively large active carbon particles dispersed non-uniformly. On the other hand, Examples 1 to 4 shown in FIGS. 7C to 7F each exhibit an active carbon granule comprising active carbon fine particles.

Figure 7B:
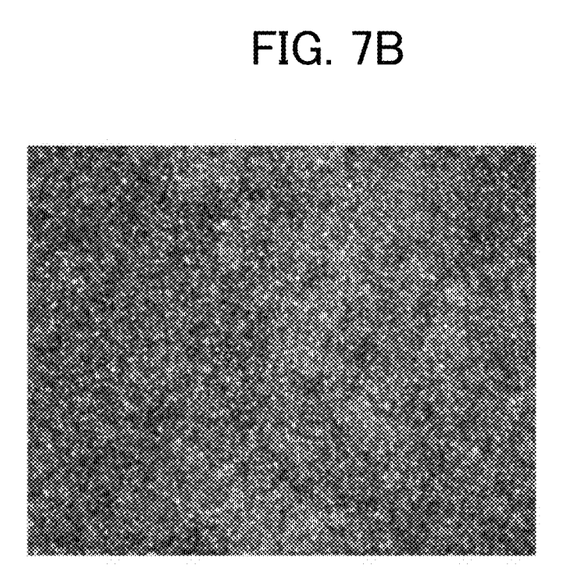
FIG. 7B is a micrograph of an active carbon particle of Comparative Example 2 according to the present embodiment.
Figure 7C:
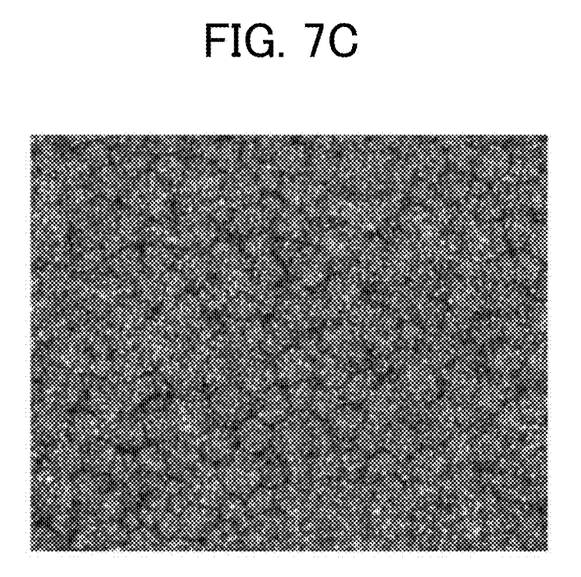
FIG. 7C is a micrograph of an active carbon particle of Example 1 according to the present embodiment.
Figure 7D:
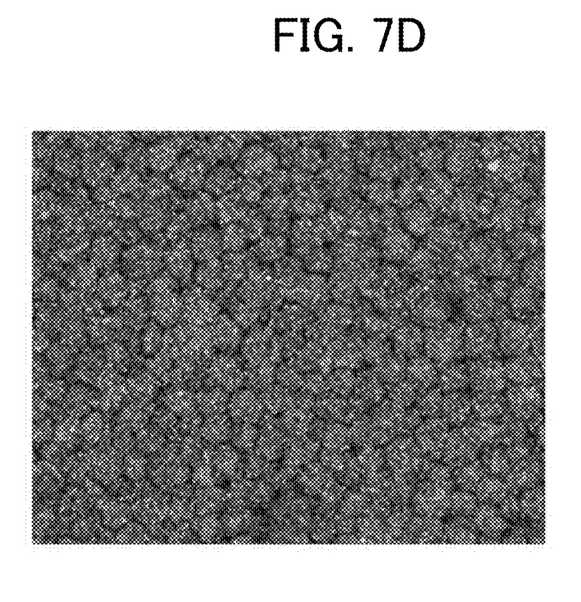
FIG. 7D is a micrograph of an active carbon particle of Example 2 according to the present embodiment.
Figure 7E:
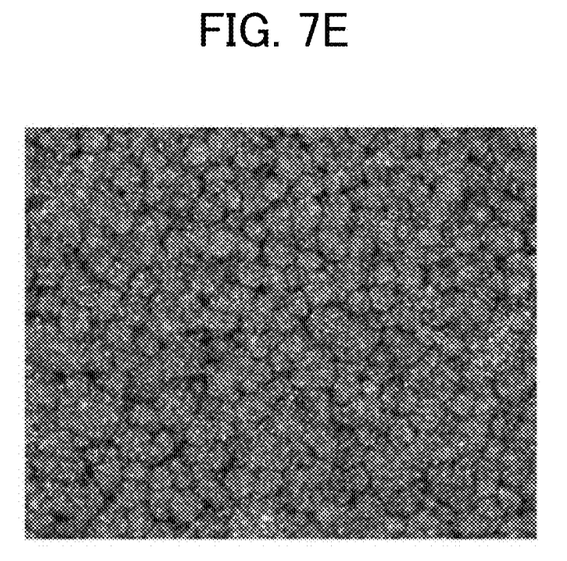
FIG. 7E is a micrograph of an active carbon particle of Example 3 according to the present embodiment.
Figure 7F:
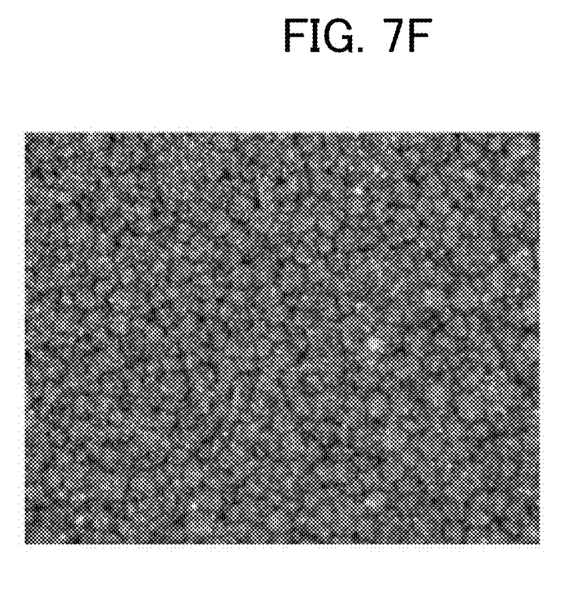
FIG. 7F is a micrograph of an active carbon particle of Example 4 according to the present embodiment.

In Comparative Example 2 shown in FIG. 7B, the amount of the granulation-purpose binder was too small to obtain a molded body.

Examples 1 to 4 exhibited significantly improved filtering capability with respect to free residual chlorine, in comparison with Comparative Example 1.

It is presumed that the use of active carbon fine particles increased the specific surface area, and consequently, the active carbon adsorbed free residual chlorine with enhanced efficiency.

In particular, the active carbon molded body including the granulation-purpose fibrous binder in an amount of 6 wt % exhibited the highest filtering capability with respect to free residual chlorine.

Examples 1 to 4 demonstrate that the filtering capability with respect to free residual chlorine decreases with an increase in the amount of the included granulation-purpose fibrous binder. The presumed reason for this is that the active carbon particles in the active carbon granules were coated with the fibrous binder so that the area in contact with water decreased.

The density of the active carbon molded bodies of Examples 1 to 4 ranged from 0.46 g/cc to 0.50 g/cc, and did not significantly differ from the density of Comparative Example 1 as the conventional product. It is presumed that the active carbon granules included in the active carbon molded bodies of Examples 1 to 4 have smaller densities than the conventional product because of the voids present in each granule, while the granules are dense and in contact with one another, whereby the whole molded body has a density approximate to that of the conventional product.

It has been demonstrated that the active carbon molded body according to the present embodiment achieves high purification performance at least within this density range.

EXPLANATION OF REFERENCE NUMERALS

1: Active Carbon Particle
2: Active Carbon Granule
21: Active Carbon Particle
22: Fibrous Binder

The invention claimed is:

1. An active carbon molded body comprising a plurality of active carbon granules,
   wherein the active carbon granule comprises an aggregation of active carbon particles and a fibrous binder, the plurality of active carbon granules is aggregated by the fibrous binder included therein,
   the active carbon molded body is obtained by molding the plurality of active carbon granules by the fibrous binder,
   the active carbon molded body comprises no molding-purpose binder other than the fibrous binder,
   the active carbon molded body includes the fibrous binder in an amount of 6 wt % or more and 20 wt % or less, and
   a density of the active carbon molded body is 0.4 g/cc to 0.5 g/cc.

2. The active carbon molded body according to claim 1, wherein the active carbon granule consists of the aggregation of active carbon particles and the fibrous binder.

3. The active carbon molded body according to claim 1, wherein a density of the active carbon molded body is 0.46 g/cc to 0.5 g/cc.

4. The active carbon molded body according to claim 1, wherein the fibrous binder includes an acrylic material.

5. A method for producing an active carbon molded body, the method comprising:
   obtaining a plurality of active carbon granules by aggregating active carbon particles by a fibrous binder;
   aggregating the active carbon granules by the fibrous binder included in the active carbon granules; and
   molding the active carbon granules aggregated, by simultaneous application of heat and pressure.

* * * * *